E. O. STANCLIFF.
SHOCK LOADER.
APPLICATION FILED JAN. 8, 1917.
1,309,550.
Patented July 8, 1919.
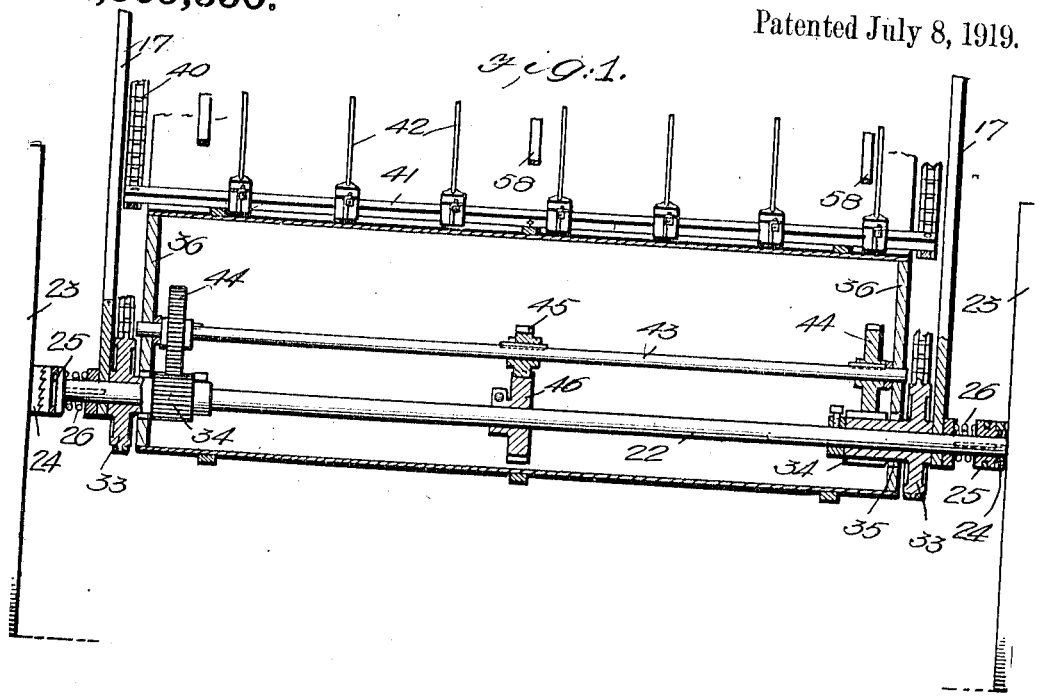
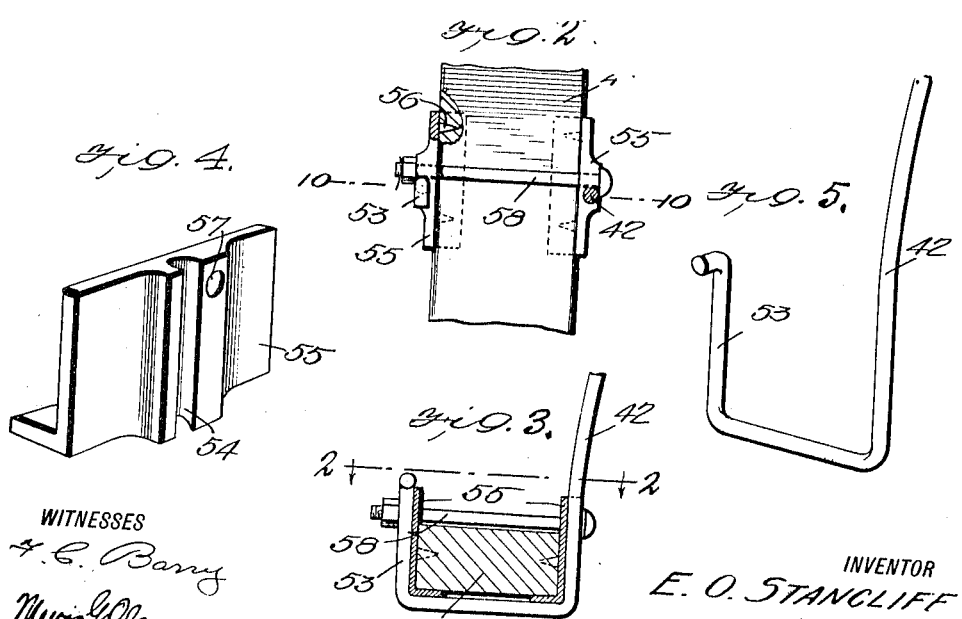
WITNESSES
INVENTOR
E. O. STANCLIFF
BY
ATTORNEYS

UNITED STATES PATENT OFFICE.

EDWIN O. STANCLIFF, OF BAKERSFIELD, CALIFORNIA.

SHOCK-LOADER.

1,309,550.　　　　Specification of Letters Patent.　　Patented July 8, 1919.

Application filed January 8, 1917.　Serial No. 141,195.

*To all whom it may concern:*

Be it known that I, EDWIN O. STANCLIFF, a citizen of the United States, and a resident of Bakersfield, in the county of Kern and State of California, have invented a certain new and useful Improvement in Shock-Loaders, of which the following is a specification.

My present invention relates generally to conveyers, and more particularly to conveyers for shock loaders, my object being to generally improve apparatus of this nature, and provide one including conveyer teeth, together with simple effective means for normally holding the same in such manner as to provide for their ready removal for purposes of repair and substitution of parts.

Other and further objects, residing more particularly in certain parts and constructions in the general makeup of the apparatus, will be better understood from the following description of the details thereof, in which reference is made to the accompanying drawings forming a part of this application, and wherein—

Figure 1 is a transverse vertical section taken through a portion of a shock loader, showing my improved conveyer in connection therewith.

Fig. 2 is a horizontal section taken substantialy on line 2—2 of Fig. 3;

Fig. 3 is a vertical section taken substantially on line 3—3 of Fig. 2;

Fig. 4 is a detail perspective view of one of the bearing plates removed, and

Fig. 5 is a detail perspective view of one of the elevator teeth removed.

In Fig. 1 I have shown certain portions of a shock loader including a wheel shaft 22 upon the extreme outer ends of which are loosely mounted wheels 23, these wheels driving the shaft through clutch connections 24—25 controlled by springs 26.

Each clutch is, however, subject to the control of a handlever 27 intermediately pivoted at 28, as seen in Fig. 8, upon a bracket 29 projecting laterally from the adjacent side bar 15, with a yoke 30 at one end engaging the annular groove of the clutch member 25, and with the latch mechanism 31 at its opposite end for engagement with the notched portion 32 of the bracket 29, so that the respective clutch member 25 may be locked in inactive position when it is desired to prevent movement of the loading apparatus in transporting the apparatus to, from, and between points of use.

Loosely mounted upon the shaft 22 at points adjacent the inner surfaces of the side bars 17, are sprocket wheels 33 having inwardly projecting geared extensions 34, which latter project through openings 35 in the lower portions of the side members 36 of the elevator, the latter forming a guide for the conveyer in its flight and across which the transverse teeth bars 41 of the latter extend.

The endless side sprocket chains 40, of the conveyer extend around the sprocket wheels 33 before described, these side chains 40 being connected by transverse teeth bars 41 to each of which is attached a row of elevator teeth 42.

The conveyer may be driven through a countershaft 43, having gears 44 adjacent its outer ends, and in engagement with the inner geared extensions 34 of the sprocket wheel 33, and also having an intermediate gear 45 in mesh with the gear 46 secured upon the wheel shaft 22, whereby to thus transmit rotation at a desirably increased speed, from the wheel shaft 22 to the driven sprocket wheels 33 rotatable on the wheel shaft, it being noted that the mechanism just above described for this purpose is thus adapted to be wholly inclosed within the elevator.

Each of the elevator teeth 42, as seen in Figs. 2 to 5 inclusive, which are curved in their length, is bent angularly at its inner end to form an offset parallel extension 53 in order that the inner portion of the tooth and its extension 53 may be seated in the vertical bearing grooves 54 of bearing plates 55 adjustably mounted upon the bars 41 and to this end provided with spurs 56 to enter the material of said bars, the bearing plates 55 having alined transverse openings 57 through which a clamping bolt 58 is extended in order to hold the plates in adjusted position and clamp the respective elevator tooth, a portion of which and its extension 53 are respectively lapped by the head of the bolt and the nut thereon, as seen particularly in Fig. 2.

It is thus obvious that the number and position of the conveyer teeth 42 may be varied in accordance with the size of the shocks to be loaded, or to suit other varying conditions in use, and that, in its operation, the wheel shaft 22 acts as a guide shaft, communicating movement to the elevator chains 40 through the countershaft 43 and the connections between the two shafts, which latter feature of improvement may, it is to be further noted, be used in apparatus other than the particular apparatus illustrated, and wherever a compact, simple, and concealable power transmission of its nature is desirable.

I claim:—

In a machine of the character described, a conveyer having cross bars, grooved plates at opposite sides of said cross bars provided with apertures, conveyer teeth having one end bent to U-form arranged to embrace the sides and lower face of the bars with the side extensions of said U ends disposed in the grooves of said plates, and bolts extending through the apertures of the plates and having portions lapping those portions of the teeth seated in the grooves, substantially as described.

EDWIN O. STANCLIFF.

Copies of this patent may be obtained for five cents each, by addressing the "Commissioner of Patents, Washington, D. C."